(12) United States Patent
Wike

(10) Patent No.: US 11,225,271 B2
(45) Date of Patent: Jan. 18, 2022

(54) DAMPING SYSTEM FOR A RAILWAY TRUCK ASSEMBLY

(71) Applicant: Amsted Rail Company, Inc., Chicago, IL (US)

(72) Inventor: Paul Steven Wike, St. Louis, MO (US)

(73) Assignee: Amsted Rail Company, Inc., Chicago, IL (US)

( * ) Notice: Subject to any disclaimer, the term of this patent is extended or adjusted under 35 U.S.C. 154(b) by 305 days.

(21) Appl. No.: 16/550,889

(22) Filed: Aug. 26, 2019

(65) Prior Publication Data

US 2021/0061319 A1    Mar. 4, 2021

(51) Int. Cl.
*B61F 5/12* (2006.01)
*B61F 5/06* (2006.01)

(52) U.S. Cl.
CPC ............ *B61F 5/122* (2013.01); *B61F 5/06* (2013.01)

(58) Field of Classification Search
CPC ... B61F 5/12; B61F 5/122; B61F 5/06; B60G 13/04; F16F 2230/0076; F16F 13/005; F16F 7/082
See application file for complete search history.

(56) References Cited

U.S. PATENT DOCUMENTS

| | | | |
|---|---|---|---|
| 2,575,137 A | * | 11/1951 | Settles ............... B61F 5/122 105/198.5 |
| 2,777,400 A | | 1/1957 | Forssell |
| 2016/0001796 A1 | | 1/2016 | Hemetian |

FOREIGN PATENT DOCUMENTS

| | | | | |
|---|---|---|---|---|
| AU | 689742 B2 | * | 4/1998 | ............... B61F 5/12 |
| FR | 77428 | | 3/1962 | |
| GB | 1357506 | | 6/1974 | |

OTHER PUBLICATIONS

International Search Report and Written Opinion for PCT/US2020/04221, dated Oct. 27, 2020.

* cited by examiner

*Primary Examiner* — Mark T Le
(74) *Attorney, Agent, or Firm* — The Small Patent Law Group LLC; Joseph M. Butscher

(57) ABSTRACT

A damping system for a truck assembly of a rail vehicle includes a first friction shoe configured to engage a first portion of a side frame of the truck assembly, and a first lever pivotally coupled to the first friction shoe.

20 Claims, 8 Drawing Sheets

DAMPING SYSTEM FOR A RAILWAY TRUCK ASSEMBLY

FIELD OF THE DISCLOSURE

Embodiments of the present disclosure generally relate to truck assemblies for rail vehicles, such as rail cars, and, more particularly, to truck assemblies that include one or more damping systems having one or more friction shoe assemblies.

BACKGROUND OF THE DISCLOSURE

Rail vehicles travel along railways, which have tracks that include rails. A rail vehicle includes one or more truck assemblies that support one or more car bodies. Each truck assembly includes two side frames and a bolster. Friction shoes are disposed between the bolster and the side frames. The friction shoes are configured to provide damping for suspension.

Typically, a friction shoe is recessed in an end of a bolster, and is mounted over control springs. Loads exerted by and/or into the rail vehicle force the friction shoe against the control springs. The friction shoe is wedged into a portion of a side frame due to engagement by the friction shoe with an angular slope face of the bolster. Longitudinal force between the friction shoe and the side frame is referred to as normal force.

A suspension of a truck assembly includes control and load coils in a center of a side frame. The suspension also supports the end of the bolster. Displacement of the suspension is the vertical movement of the bolster in relation to the side frame. The normal force of the friction shoe causes friction in a vertical direction that dampens the movement between the bolster and side frame.

Friction shoes also keep the bolster centered in the side frame. Vertical loads balance between opposing friction shoes. Longitudinal loads are generated in a direction of travel and during curving and braking. Because of the generated longitudinal loads, the friction shoes longitudinally and vertically shift to different positions, thereby rebalancing the loads. For example, a first friction shoe is forced in and down, while a second friction shoe that opposes the first friction shoe is forced out and up. Notably, the longitudinal and vertical repositioning misaligns (for example, misaligns from a center position) the bolster to the side frames, which is referred to as uneven shoe rise. If the opposite movement occurs on the other side of the truck assembly, uneven shoe rise repositions the side frames, which, in turn, may warp wheelsets of the truck assembly, thereby creating an angle of attack between the wheel and rail. The angle of attack may lead to instability and wearing of the wheelsets.

Additionally, truck warping is the hinging of the side frames about the bolster. Warp stiffness is created by the shoe normal force pressing against the side frames. When the normal force is exceeded, the friction shoes are forced down, and truck warping occurs. Further, truck warping may also lead to an angle of attack between the wheel and the rail.

SUMMARY OF THE DISCLOSURE

A need exists for an efficient and effective damping system for a truck assembly. Further, a need exists for a damping system for a truck assembly that eliminates, minimizes, or otherwise reduces shoe rise and truck warping.

With those needs in mind, certain embodiments of the present disclosure provide a damping system for a truck assembly of a rail vehicle. The damping system includes a first friction shoe configured to engage a first portion of a side frame of the truck assembly, and a first lever pivotally coupled to the first friction shoe.

In at least one embodiment, the damping system also includes a housing. The first friction shoe extends outwardly from the housing. The first lever is pivotally coupled to the housing to axially constrain the first lever in relation to the housing. The housing may be coupled to or form part of a bolster of the truck assembly.

In at least one embodiment, the damping system also includes a plurality of load coils. The housing is supported on the plurality of load coils. The load coils may be disposed around a first control coil that is pivotally coupled to the first lever.

In at least one embodiment, the damping system includes a first control coil pivotally coupled to the first lever. A first spring seat may pivotally couple the first lever to the first control coil. The first lever may include an extension beam having a proximal end pivotally coupled to the first spring seat. As an example, the first spring seat includes a cap and downwardly-extending tabs that fit around an upper end of the first control coil.

In at least one embodiment, the first friction shoe includes a main body having an engaging face connected to lateral walls. The engaging face is configured to engage the first portion of the side frame.

In at least one embodiment, the damping system also includes a second friction shoe configured to engage a second portion of the side frame of the truck assembly, and a second lever pivotally coupled to the second friction shoe.

Certain embodiments of the present disclosure provide a damping method for a truck assembly of a rail vehicle. The damping method includes providing a first friction shoe that engages a first portion of a side frame of the truck assembly, and pivotally coupling a first lever to the first friction shoe. The damping method may also include extending the first friction shoe outwardly from a housing extending from or forming part of a bolster, and pivotally coupling the first lever to the housing. The damping method may also include pivotally coupling a first control coil to the first lever.

Certain embodiments of the present disclosure provide a truck assembly of a rail vehicle. The truck assembly includes a side frame having an opening between a first column and a second column, a bolster coupled to the side frame, and a damping system extending from the bolster into the opening of the side frame. The damping system includes a housing. A first friction shoe extends outwardly from the housing and engages the first column of the side frame of the truck assembly. The first friction shoe includes a first main body having a first engaging face connected to first lateral walls. The first engaging face engages the first column. A first lever is pivotally coupled to the first friction shoe. The first lever is also pivotally coupled to the housing to axially constrain the first lever in relation to the housing. A first control coil is pivotally coupled to the first lever.

In at least one embodiment, the damping system also includes a second friction shoe extending outwardly from the housing and engaging the second column of the side frame of the truck assembly. The second friction shoe includes a second main body having a second engaging face connected to second lateral walls. The second engaging face engages the second column. A second lever is pivotally coupled to the second friction shoe. The second lever is also pivotally coupled to the housing to axially constrain the second lever in relation to the housing. A second control coil is pivotally coupled to the second lever.

DETAILED DESCRIPTION OF THE DISCLOSURE

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide a damping system for a truck assembly of a rail vehicle. The damping system includes one or more lever-operated friction shoes. The lever-operated friction shoes use a lever length ratio to provide a normal force. Weight, lading, and vehicle dynamics exerted into a bolster increases a spring force, which is multiplied by the lever length ratio, and is transferred to the friction shoes as normal force on to the side frame.

As described herein, certain embodiments of the present disclosure provide a damping system for a truck assembly of a rail vehicle. The damping system includes a friction shoe configured to engage a portion of a side frame of the truck assembly, and a lever pivotally coupled to the first friction shoe. In at least one embodiment, the friction shoe extends outwardly from the housing. The first lever may be pivotally coupled to the housing. The housing is coupled to, or forms part of, a bolster of the truck assembly.

Figure 1:
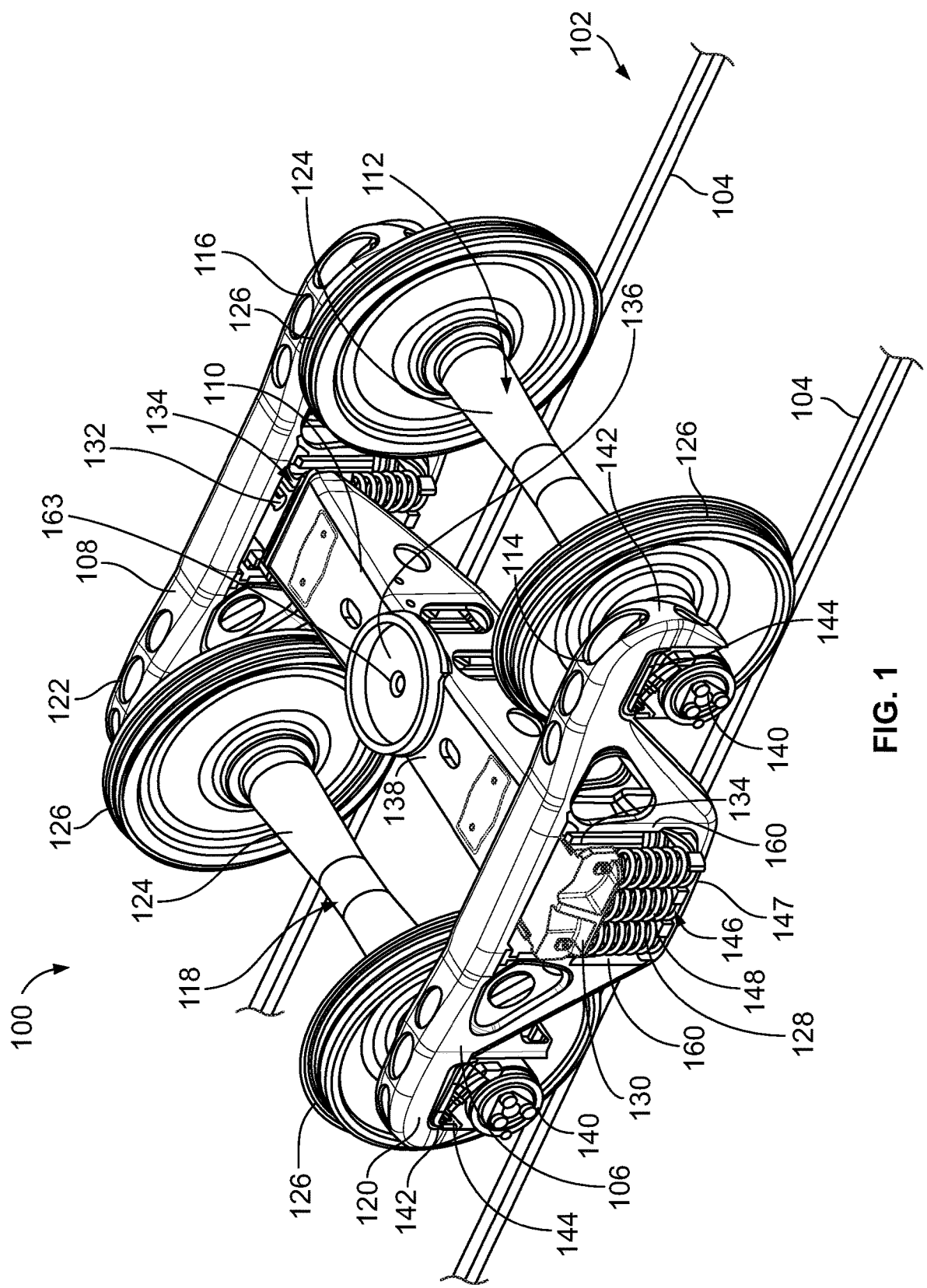
FIG. 1 illustrate a perspective top view of a truck assembly, according to an embodiment of the present disclosure.

FIG. 1 illustrate a perspective top view of a truck assembly 100, according to an embodiment of the present disclosure. The truck assembly 100 is configured to travel along a track 102 having rails 104. The truck assembly 100 includes a first side frame 106 and a second side frame 108, which are spaced apart from one another. A bolster 110 extends between the first side frame 106 and the second side frame 108, and couples the first side frame 106 to the second side frame 108.

A first wheel set 112 is rotatably coupled to first ends 114 and 116 of the first side frame 106 and the second side frame 108, respectively, and a second wheel set 118 is rotatably coupled to second ends 120 and 122 of the first side frame 106 and the second side frame 108, respectively. Each of the first and second wheel sets 112 and 118 includes an axle 124 connected to wheels 126. The wheels 126 are supported on the rails 104 and are configured to travel thereon as the axles 124 rotate in relation to the first side frame 106 and the second side frame 108.

The first and second side frames 106 and 108 includes damping systems 128. As explained herein, the damping systems 128 include one or more springs, friction shoes, and the like that are configured to dampen forces exerted into and/or by the truck assembly 100 as the truck assembly 100 travels along the track 102.

The bolster 110 includes ends 130 and 132 (for example a first end 130 and an opposite second end 132), which extend through openings 134 of the side frames 106 and 108. The bolster 110 also includes a bolster center bowl 136 outwardly extending from an upper surface 138. As shown, the bolster center bowl 136 is centrally located at a center 163 on the upper surface 138 of the bolster 110 between the ends 130 and 132.

Ends of the axles 124 are rotatably retained by bearings 140, which are coupled to the side frames 106 and 108. In particular, the wheel sets 112 and 118 are coupled to the side frames 106 and 108 at pedestals 142 of the side frames 106 and 108. The pedestals 142 connect to bearing adapters 144 that connect to the bearings 140.

In at least one embodiment, the damping systems 128 include spring groups 146 supported within the openings 134 of the side frames 106 and 108. The spring groups 146 include load coils 148 and control coils (hidden from view in FIG. 1). The load coils 148 support the bolster 110 at the ends 130 and 132. The control coils support friction shoes (hidden from view in FIG. 1) that engage portions of a side frame 106 or 108, such as columns 160 and/or wear plates of the side frames 106 and 108.

As described herein, the truck assembly 100 includes the side frames 106 and 108. Each of the side frames 106 and 108 has an opening 134 between a first column 160 and a second column 160. The bolster 110 coupled to the side frames 106 and 108. The damping systems 128 extends from the ends 130 and 132 of the bolster into the opening 134 of the side frame 106 and 108.

Figure 2:
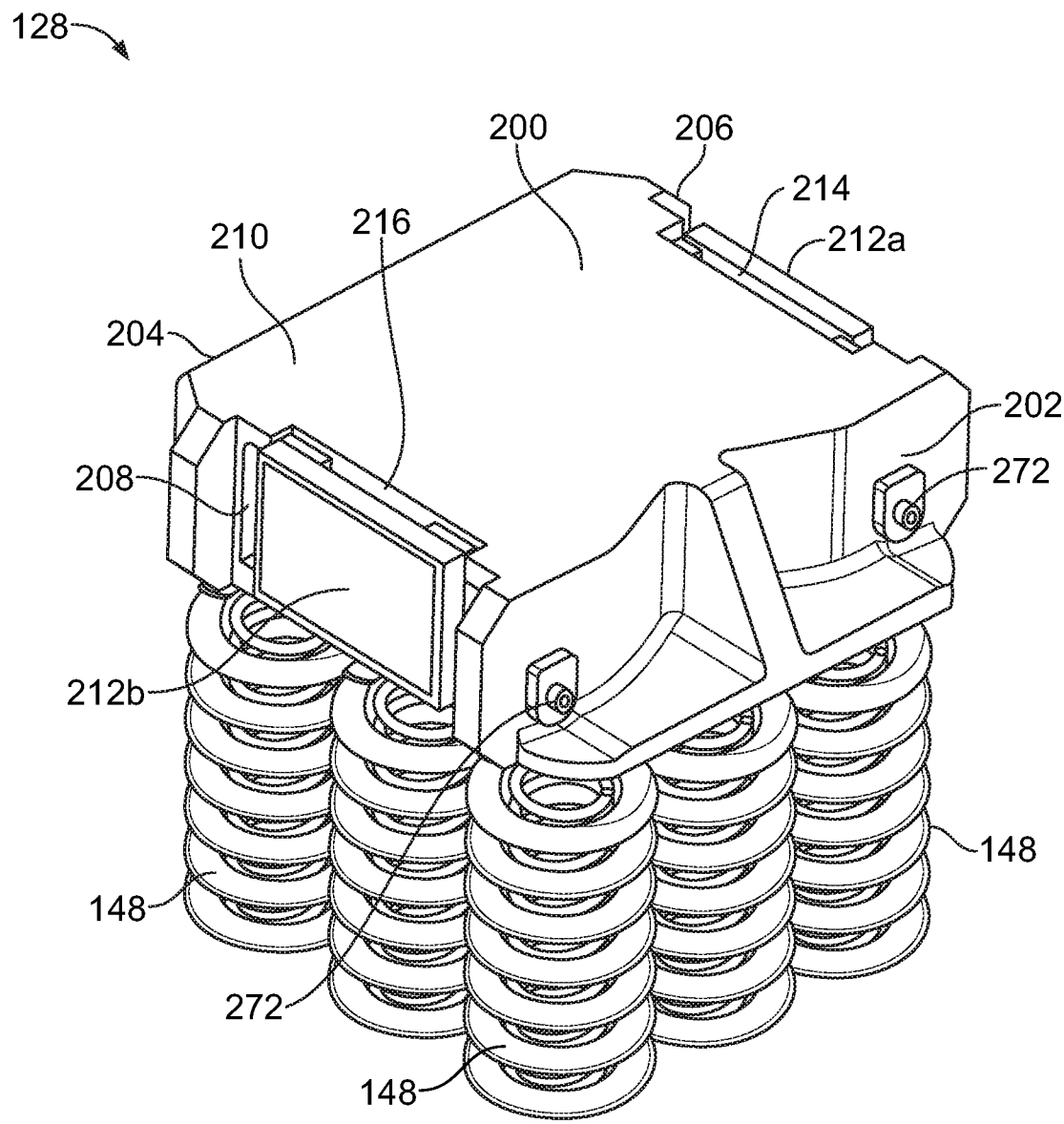
FIG. 2 illustrates a perspective top view of a damping system, according to an embodiment of the present disclosure.

FIG. 2 illustrates a perspective top view of the damping system 128, according to an embodiment of the present disclosure. The damping system 128 includes a housing 200 supported on the load coils 148, which are mounted over a base 147 of side frame 106 or 108 between the columns 160. The housing 200 may be an integral part of the bolster 110 (shown in FIG. 1), and/or secured to the bolster 110 within an opening 134 (shown in FIG. 1) of the side frames 106 and 108 (shown in FIG. 1).

The housing 200 includes an outer lateral wall 202 coupled to an inner lateral wall 204 through a front wall 206, a rear wall 208, and a top wall 210. The outer lateral wall 202, the inner lateral wall 204, the front wall 206, the rear wall 208, and the top wall 210 may be integrally molded and formed as a single piece. Optionally, at least portions of the lateral wall 202, the inner lateral wall 204, the front wall 206, the rear wall 206, and the top wall 210 may be separately secured together through fasteners, adhesives, and/or the like.

A friction shoe 212 extends through a channel 214 formed through the front wall 206. Similarly, a friction shoe 212 extends through a channel 216 formed through the rear wall 206. As shown, the damping system 128 may include two friction shoes 212a and 212b, each of which is configured to engage a column 160 (shown in FIG. 1) and/or wear plate of a side frame 106 or 108 (shown in FIG. 1). Optionally, the damping system 128 may include only one friction shoe 212a or 212b. For example, separate damping systems 128 having a friction shoe 212a or 212b may engage a separate column or wear plate of side frame.

Figure 3:
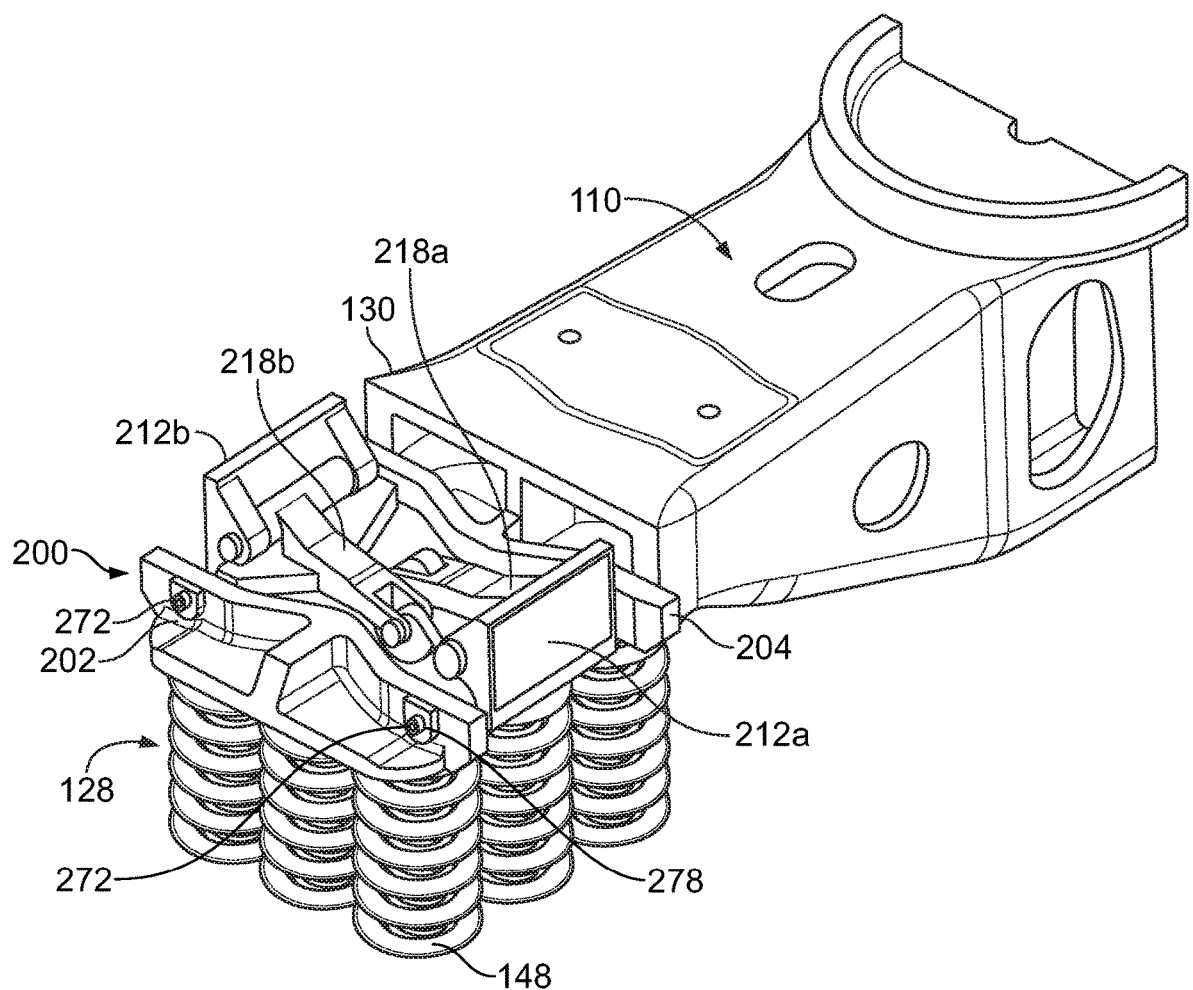
FIG. 3 illustrates a perspective top view of the damping system coupled to an end of a bolster, according to an embodiment of the present disclosure.

FIG. 3 illustrates a perspective top view of the damping system 128 coupled to the end 130 of the bolster 110, according to an embodiment of the present disclosure. The damping system 128 is coupled to the end 130 of the bolster 110, or forms a portion of the end 130 of the bolster 110. In order to show certain internal portions of the damping system 128, top portions of the housing 200 are not shown in FIG. 3. The damping system 128 includes a lever 218a coupled to the friction shoe 212a, and a lever 218b coupled to the friction shoe 212b.

Figure 4:
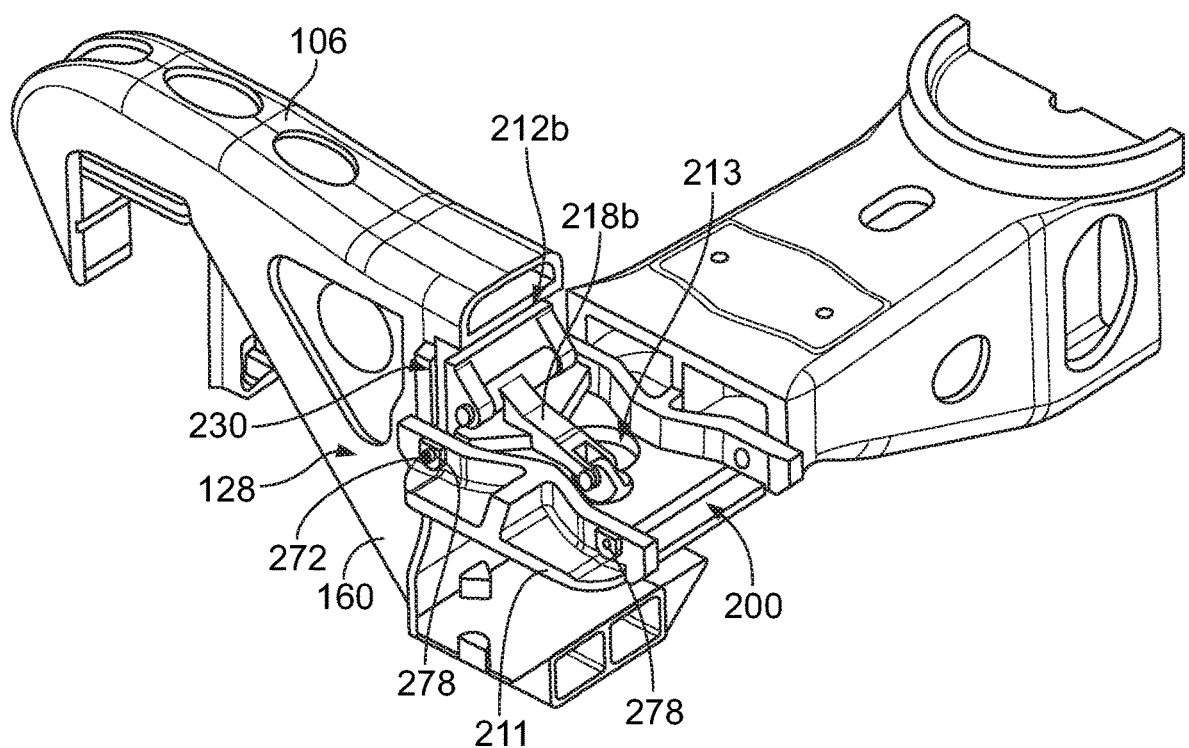
FIG. 4 illustrates a perspective top view of a friction shoe of the damping system engaging a column of a side frame, according to an embodiment of the present disclosure.

FIG. 4 illustrates a perspective top view of the friction shoe 212b of the damping system 128 engaging a column 160 of the side frame 106, according to an embodiment of the present disclosure. The load coils and the control coils of the damping system 128 are not shown in FIG. 4. Further, for the sake of clarity, only the friction shoe 212b (but not the friction shoe 212a) is shown in FIG. 4. As shown, the friction shoe 212b may abut against a wear plate 230 secured to an interior surface of the column 160. Optionally, the friction shoe 212b may abut directly against the column 160.

Figure 5:
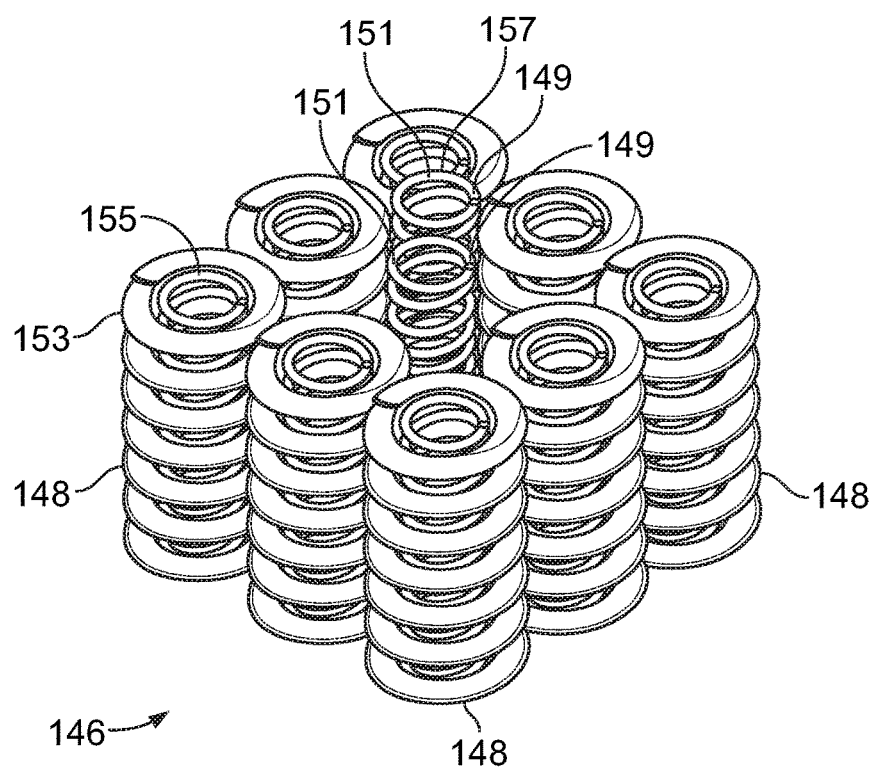
FIG. 5 illustrates a perspective top view of a spring group, according to an embodiment of the present disclosure.
Figure 6:
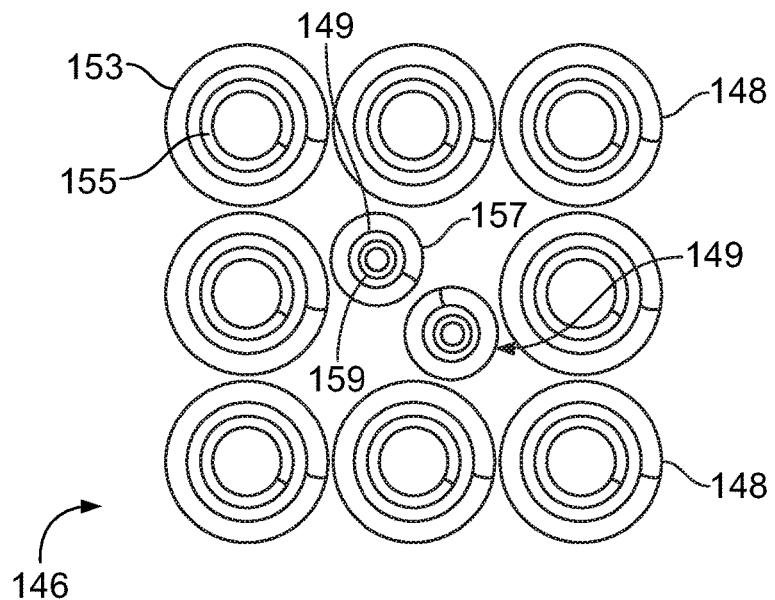
FIG. 6 illustrates a top plan view of the spring group.

FIG. 5 illustrates a perspective top view of the spring group 146, according to an embodiment of the present disclosure. FIG. 6 illustrates a top plan view of the spring group 146. The spring group 146 includes the load coils 148 positioned around the control coils 149. As shown, the spring group 146 may include eight load coils 148 positioned around two control coils 149.

Referring to FIGS. 4-6, a base 211 of the housing 200 seats on the load coils 148. Upper ends 151 of the control coils 149 extend through one or more openings 213 of the base 211 and couple to the lever arms 218a and 218b. For example, one of the control coils 149 couples to the lever 218a, while the other control coil 149 couples to the lever 218b.

Each of the load coils 148 may include an outer spring member 153 positioned around an inner spring member 155. The outer spring member 153 may have a different spring force constant than the inner spring member 155. Similarly, each of the control coils 149 may include an outer spring member 157 positioned around an inner spring member 159. The outer spring member 157 may have a different spring force constant than the inner spring member 159. As such, the load coils 148 and the control coils 149 may provide a dual rate system having a first stiffness for an empty car when the longer inner coil members contact the housing 200 and/or portions therein, and a second stiffness (higher than the first stiffness) for a loaded car when the inner coil members and the outer coil members both contact the housing 200 and/or portions therein. Alternatively, one or more of the load coils 148 and one or both of the control coils 149 may include a single coil member.

Figure 7:
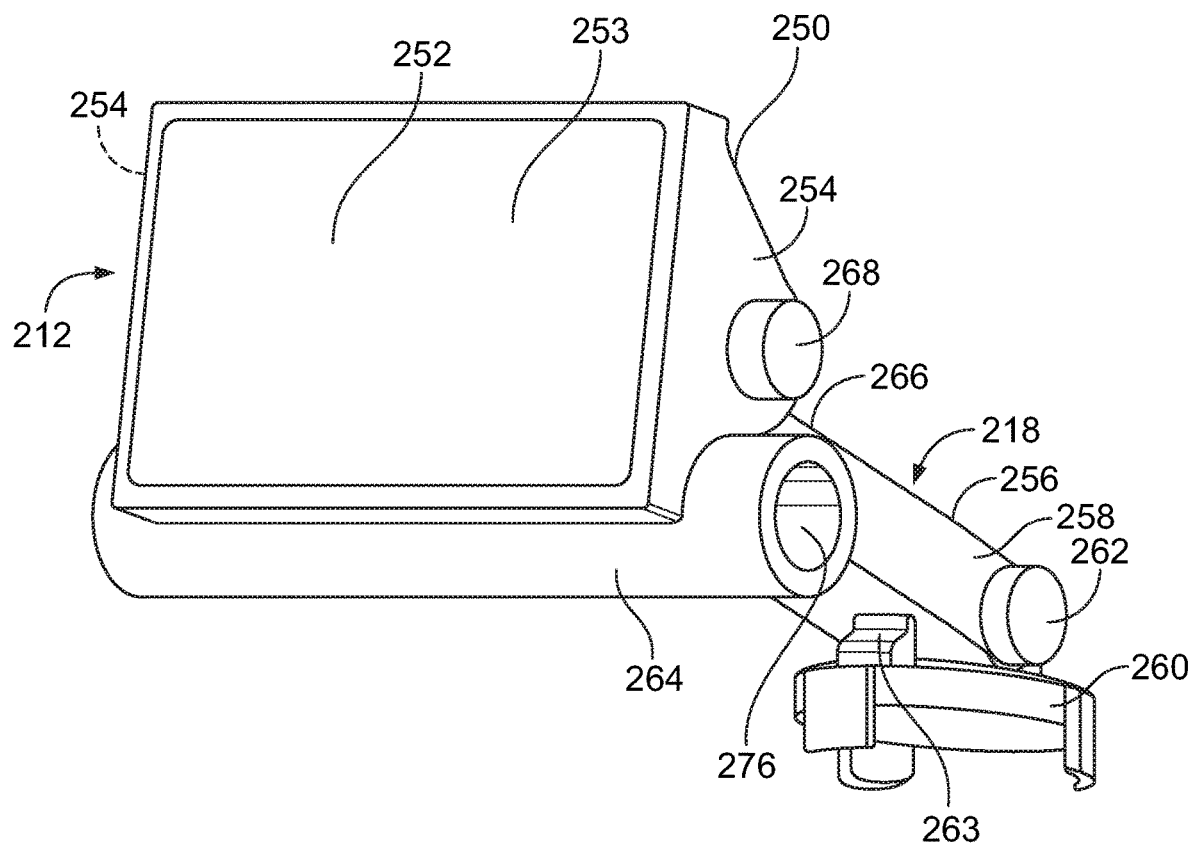
FIG. 7 illustrates a perspective front view of a friction shoe coupled to a lever, according to an embodiment of the present disclosure.
Figure 8:
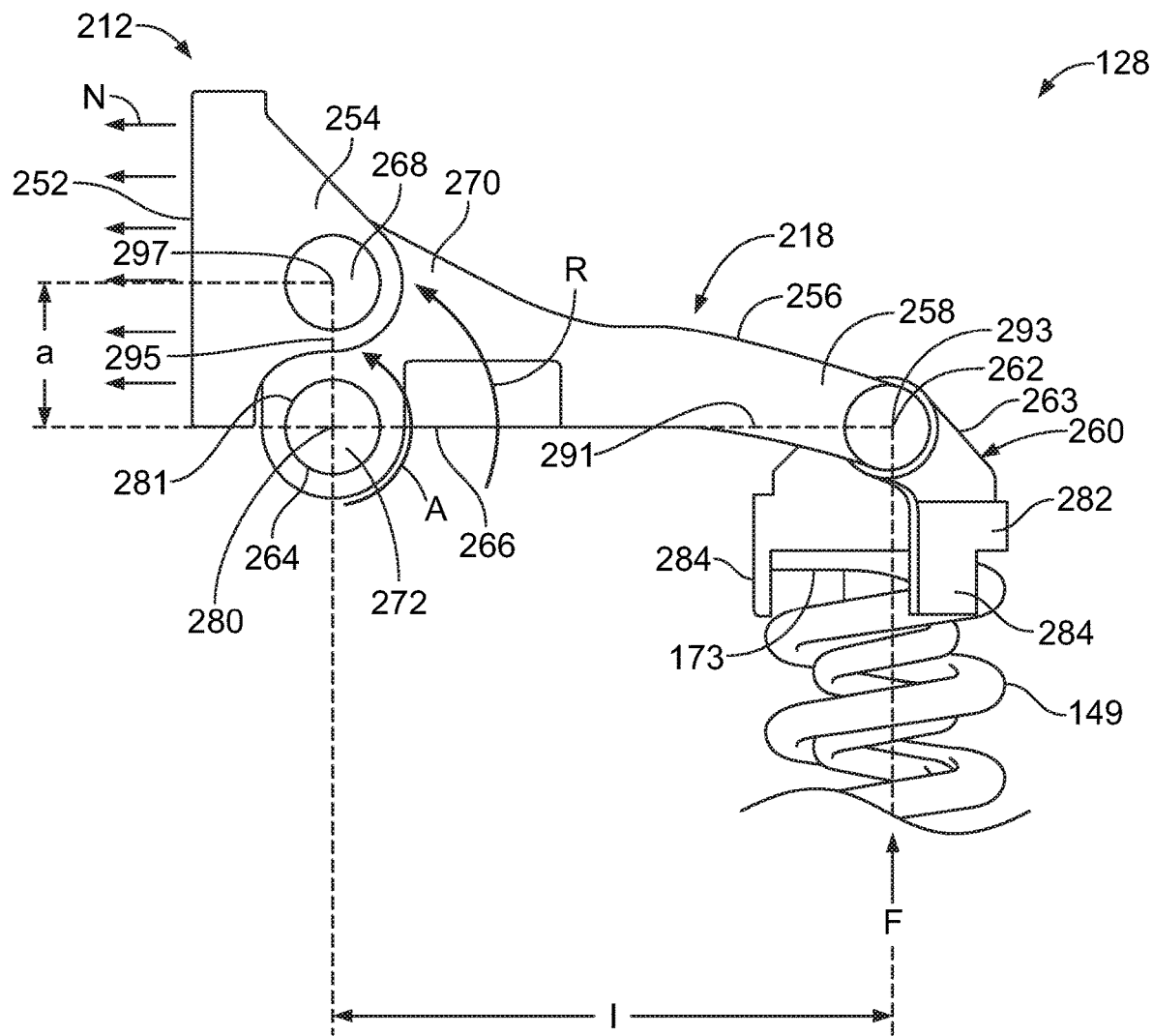
FIG. 8 illustrates a lateral view of the friction shoe coupled to the lever.

FIG. 7 illustrates a perspective front view of a friction shoe 212 coupled to a lever 218, according to an embodiment of the present disclosure. FIG. 8 illustrates a lateral view of the friction shoe 212 coupled to the lever 218. The friction shoes 212a and 212b, and the levers 218a and 218b shown in FIG. 2-4 are configured as shown in FIG. 7.

Referring to FIGS. 7 and 8, each friction shoe 212 includes a main body 250 having an engaging face 252 connected to lateral walls 254. The engaging face 252 is configured to directly contact a column and/or a wear plate of a side frame. The engaging face 252 may include and/or otherwise be formed by of a polymer, such as an inorganic polymer insert 253. Optionally, the engaging face 252 may be formed of a metal, such as steel or iron.

The lever 218 includes an extension beam 256 having a proximal end 258 pivotally coupled to a spring seat 260 through a spring pivot pin 262. The spring pivot pin 262 may be a separate and distinct pin, or may optionally be integrally formed with one of the lever 218 or the spring seat 260. For example, the spring pivot pin 262 extends through the proximal end 258 and an upper fin 263 of the spring seat 260.

A cross beam 264 extends from a distal end 266 of the extension beam 256. A shoe pivot pin 268 extends through one or both of the lateral walls 254 of the friction shoe 212 and a bracket 270 of the lever 218 that extends over the cross beam 264. The shoe pivot pin 268 may be a separate and distinct pin, or may optionally be integrally formed with one of the bracket 270 or the lateral wall(s) 254. As such, the friction shoe 212 is pivotally coupled to the lever 218.

Referring to FIGS. 2, 3, 4, 7, and 8, a fulcrum pivot pin 272 extends through a central passage 276 of the cross beam 264. Optionally, the fulcrum pivot pin 272 may be an integral part of the cross beam 264 (for example, ends of the cross beam 264 may formed the fulcrum pivot pin 272). Ends of the fulcrum pivot pin 272 extend through conforming channels 278 formed through outer lateral wall 202 and the inner lateral wall 204 of the housing 200 to pivotally couple the lever 218 to the housing 200. In this manner, the lever 218 is axially constrained by the housing 200, and is configured to pivot in the direction of arc A about a fulcrum axis 280 defined by a central axis of the fulcrum pivot pin 272. The lever 218 and/or the friction shoe 212 may include one or more stops (such as a tab, block, or the like) that limits pivotal motion of the friction shoe 212 relative to the lever 218. For example, a stop 281 between the friction shoe 212 and the lever 218 prevents or otherwise reduces the possibility of the friction shoe 212 and the lever 218 from backing up when the normal force N is exceeded. Optionally, the damping system 128 may not include the stop 281.

The spring seat 260 includes a cap 282 that fits over an upper end 173 of a control coil 149. Tabs 284 may downwardly extend from the cap 282 and fit around circumferential portions of the control coil 149. In this manner, the cap 282 and the tabs 284 trap the upper end 173 of the control coil 149, thereby preventing or otherwise reducing the possibility of the control coil 149 dislodging from the spring seat 260 or rotating in relation to the spring seat 260. For example, the upper end 173 of the control coil 149 may be adhesively secured to the spring seat 260, and/or retained within an opening or channel formed in the spring seat 260. The upper fin 263 extends upwardly from an upper surface of the cap 282.

As described herein, the friction shoe 212 is pivotally coupled to the lever 218, which is, in turn, pivotally coupled to the housing 200, as well as pivotally coupled to the control coil 149 via the spring seat 260. The normal force is created via the lever 218, rather than through angular wedge force (as with conventional friction shoes).

The normal force N exerted by the engaging face 252 of the friction shoe 212 into the column 160 and/or the wear plate 230 is determined through the following equation:

$$N = F \times (l/a)$$

in which F is the spring force exerted into the spring pivot pin 262, l is the length of the lever arm 282 between the center of the spring pivot pin 262 and the fulcrum axis 280 (that is, the effort arm), and a is the distance between the fulcrum axis 280 and the center of the shoe pivot pin 268 (that is, the resistance arm). The spring force F acting on the effort arm l creates a rotational moment force R about the fulcrum axis 280. The rotational moment force R is transferred to the resistance arm a, and finally through the friction shoe 212 as the normal force N. The friction shoe 212 uses the lever length ratio (l/a) to provide the normal force N. As force (such as weight, lading, vehicle dynamics, and/or the like) is exerted into the bolster 110, the spring force F increases. The spring force F multiplied by the lever length ratio (l/a) is transferred to the friction shoe as normal force N, and subsequently to the column 160 of the side frame 106 or 108.

As noted, the fulcrum axis 280 is secured to the housing 200, such as may form part of the bolster 110. The attachment of the fulcrum axis 280 of the lever 218 ensures that the friction shoe 212 does not change position with unbalanced loading, thereby eliminating, minimizing, or otherwise reducing the possibility of shoe rise and/or warping.

Figure 9:
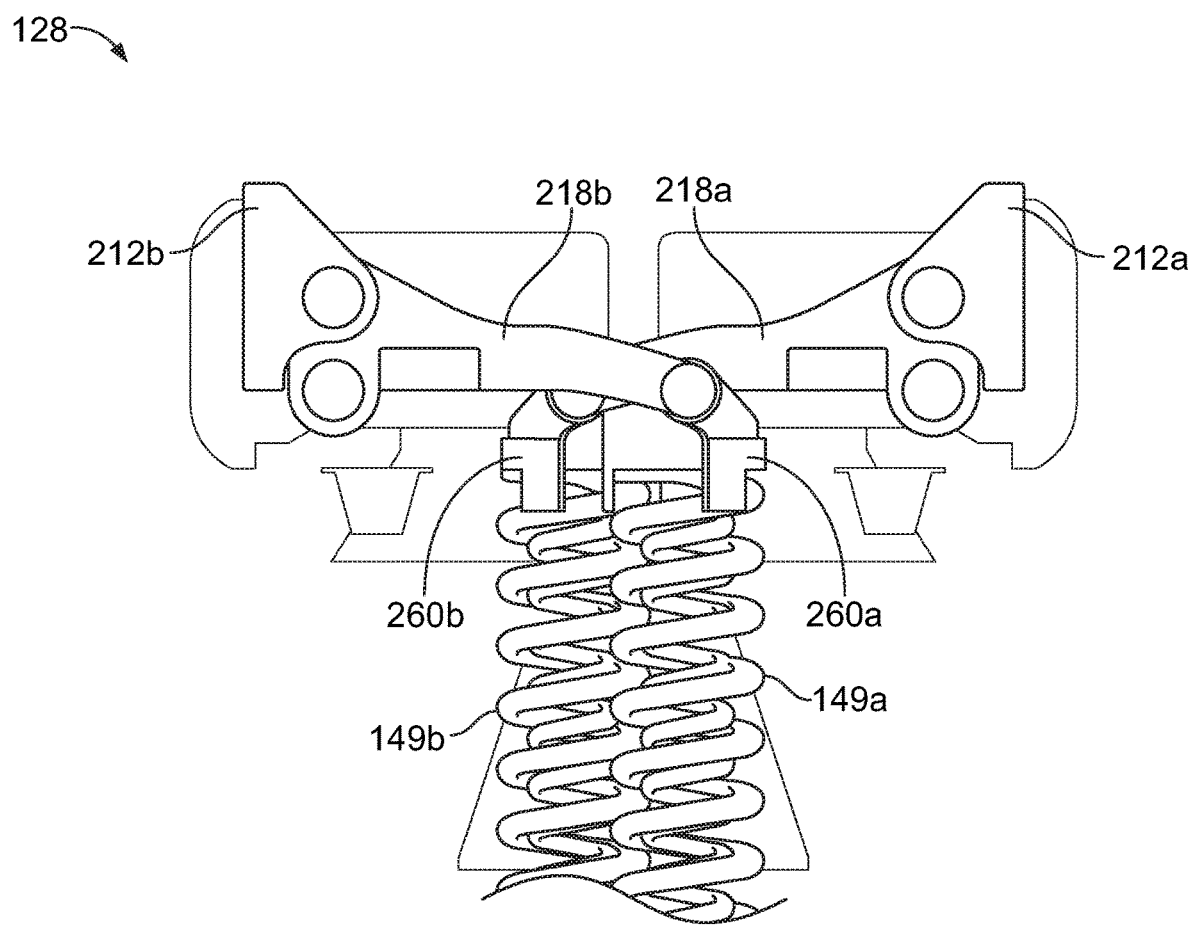
FIG. 9 illustrates a lateral view of the damping system, according to an embodiment of the present disclosure.

FIG. 9 illustrates a lateral view of the damping system 128, according to an embodiment of the present disclosure. The damping system 128 includes a first friction shoe 212a coupled to a first lever 218a, which is in turn coupled to a first control spring 149a, such as through a first spring seat 260a. The damping system 128 also includes a second friction shoe 212b coupled to a second lever 218b, which is in turn coupled to a second control spring 149b, such as through a second spring seat 260b. The first friction shoe 212a is configured to engage a first column or first wear plate of a side frame, and the second shoe 212b opposes the first friction shoe 212a and is configured to engage an opposite second column or second wear plate of the side frame.

Figure 10:
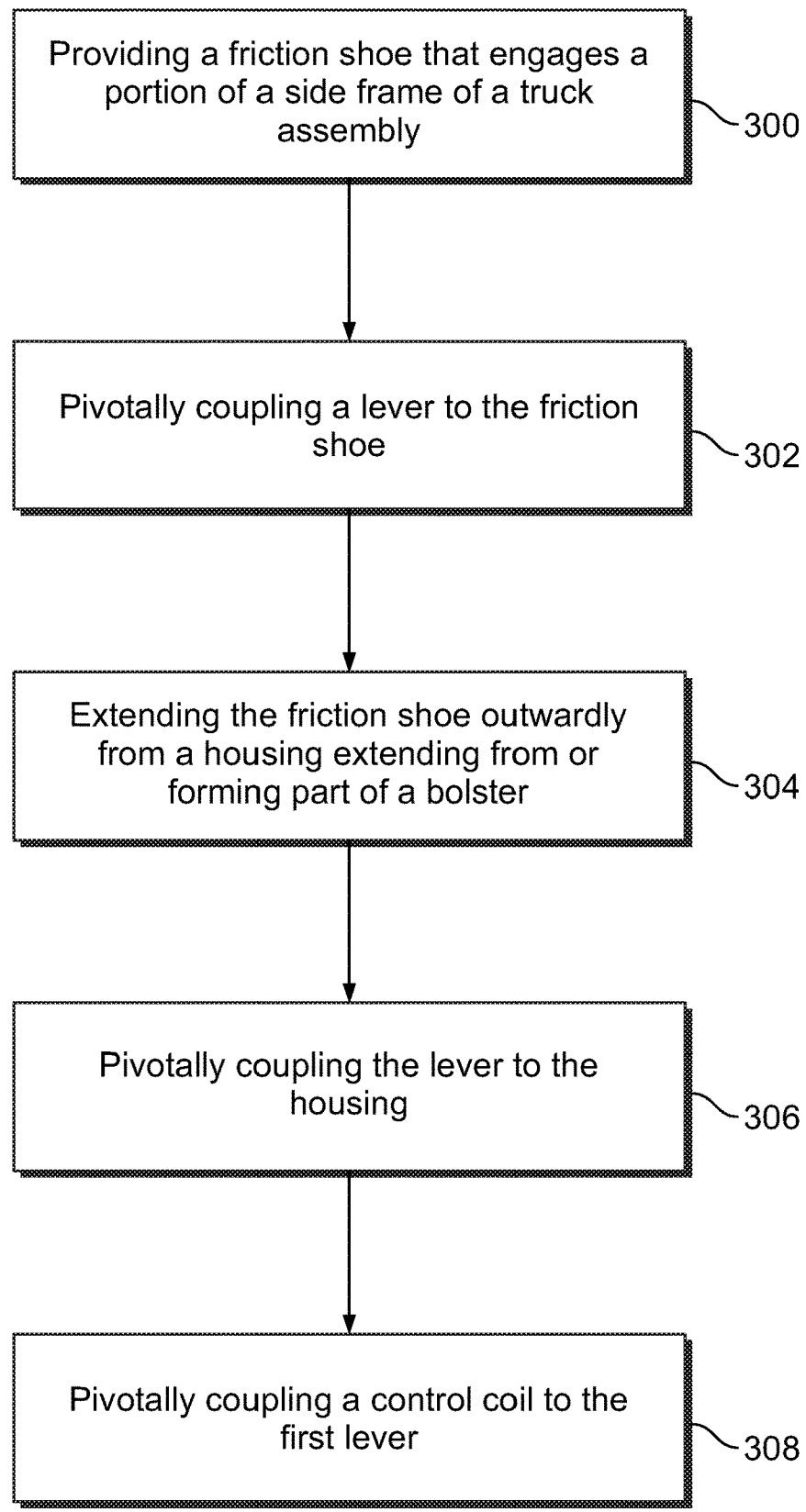
FIG. 10 illustrates a flow chart of a damping method for a truck assembly of a rail vehicle, according to an embodiment of the present disclosure.

FIG. 10 illustrates a flow chart of a damping method for a truck assembly of a rail vehicle, according to an embodiment of the present disclosure. The damping method comprises providing (300) a first friction shoe that engages a first portion of a side frame of the truck assembly, and pivotally coupling (302) a first lever to the first friction shoe. The damping method may also include extending (304) the first friction shoe outwardly from a housing extending from or forming part of a bolster, and pivotally coupling (306) the first lever to the housing. The damping method may also include pivotally coupling (308) a first control coil to the first lever.

Referring to FIGS. 1-10, in contrast to a conventional friction wedge, the damping system 128 (including at least one friction shoe 212 coupled to at least one lever 218, which, in turn, is coupled to at least one control spring 149) exhibits a lever length ratio (l/a) that is dependent on the spring stiffness (that is, spring force F) regardless of the direction of travel (whether the spring is compressing or expanding). There is little or no uneven addition of friction. A running surface of the friction shoe 212 is proximate to the shoe pivot pin 268 (that is, a pin joint), thereby reducing sliding moment and edge loading, which eliminates, minimizes, or otherwise reduces stick and slip. Further, the lever pivot pin 272, which is pivotally anchored in the housing 200, keeps the friction shoe 212 from axially shifting, which prevents or otherwise reduces the potential for warping and instability.

The friction shoe 212 has a minimal or otherwise reduced moment connection (that is, between the shoe pivot pin 268 and the fulcrum pivot pin 272), thereby keeping the normal force N distributed over the engaging face 252 regardless of the direction of travel, which in turn creates constant friction without slipping and sticking. For example, the shoe pivot pin 268 is positioned directly above the fulcrum pivot pin 272. In at least one embodiment, a plane 291 between the fulcrum pivot axis 280 and an axis 293 of the spring pivot pin 262 is at a right angle with respect to a plane 295 between fulcrum pivot axis 280 and an axis 297 of the shoe pivot pin 268. The fulcrum pivot pin 272 pivotally anchored in the housing 200 ensures that the friction shoe does not axially shift, which reduces a possibility of warping and/or instability. Further, the normal force N is dependent on the spring force F regardless of direction, in contrast to a conventional shoe wedge, which exhibits variable force depending on a direction of travel.

A known method to reduce warping is to add a transom, cross bracing, or a spring plank between side frames, thereby holding the side frames rigged to each other. Trucks with such features are referred to as premium trucks that are heavier and more costly than a three-piece truck assembly. In contrast, embodiments of the present disclosure provide lever-operated friction shoes 212, which lead to a lighter, less costly, and better performing truck assembly as compared to premium trucks.

As described herein, embodiments of the present disclosure provide efficient and effective damping systems for truck assemblies of rail vehicles. The damping systems eliminate, minimize, or otherwise reduce shoe rise and truck warping.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

The invention claimed is:

1. A damping system for a truck assembly of a rail vehicle, the damping system comprising:
   a housing;
   a first friction shoe extending outwardly from the housing, wherein the first friction shoe is configured to engage a first portion of a side frame of the truck assembly; and
   a first lever pivotally coupled to the first friction shoe, the first lever including a first extension beam having a proximal end pivotally coupled to a first spring seat through a first spring pivot pin, wherein a first cross beam extends from a distal end of the first extension beam, and wherein the first cross beam is pivotally coupled to the housing through a first fulcrum pivot pin.

2. The damping system of claim 1, wherein the housing is coupled to or forms part of a bolster of the truck assembly.

3. The damping system of claim 1, further comprising a plurality of load coils, wherein the housing is supported on the plurality of load coils.

4. The damping system of claim 3, wherein the plurality of load coils are disposed around a first control coil that is pivotally coupled to the first lever.

5. The damping system of claim 1, further comprising a first control coil pivotally coupled to the first lever.

6. The damping system of claim 5, wherein the first spring seat pivotally couples the first lever to the first control coil.

7. The damping system of claim 5, wherein the first spring seat comprises a cap and downwardly-extending tabs that fit around an upper end of the first control coil.

8. The damping system of clam 1, wherein the first friction shoe comprises a main body having an engaging face connected to lateral walls, wherein the engaging face is configured to engage the first portion of the side frame.

9. The damping system of claim 1, further comprising:
   a second friction shoe extending outwardly from the housing, wherein the second friction shoe is configured to engage a second portion of the side frame of the truck assembly; and
   a second lever pivotally coupled to the second friction shoe, the second lever including a second extension beam having a proximal end pivotally coupled to a second spring seat through a second spring pivot pin, wherein a second cross beam extends from a distal end of the second extension beam, and wherein the second cross beam is pivotally coupled to the housing through a second fulcrum pivot pin.

10. A damping method for a truck assembly of a rail vehicle, the damping method comprising:
    providing a first friction shoe that engages a first portion of a side frame of the truck assembly, wherein the first friction shoe extends outwardly from a housing; and
    pivotally coupling a first lever to the first friction shoe;
    pivotally coupling a proximal end of a first extension beam of the first lever to a first spring seat through a first spring pivot pin; and
    pivotally coupling the first lever to the housing, wherein said pivotally coupling the first lever to the housing comprises pivotally coupling a first cross beam extending from a distal end of the first extension beam to the housing through a first fulcrum pivot pin.

11. The damping method of claim 10, further comprising pivotally coupling a first control coil to the first lever.

12. A truck assembly of a rail vehicle, the truck assembly comprising:
    a side frame having an opening between a first column and a second column;
    a bolster coupled to the side frame; and
    a damping system extending from the bolster into the opening of the side frame, wherein the damping system comprises:
    a housing;
    a first friction shoe extending outwardly from the housing and engaging the first column of the side frame of the truck assembly, wherein the first friction shoe comprises a first main body having a first engaging face connected to first lateral walls, wherein the first engaging face engages the first column;
    a first lever pivotally coupled to the first friction shoe, wherein the first lever is also pivotally coupled to the housing to axially constrain the first lever in relation to the housing, the first lever including a first extension beam having a proximal end pivotally coupled to a first spring seat through a first spring pivot pin, wherein a first cross beam extends from a distal end of the first extension beam, and wherein the first cross beam is pivotally coupled to the housing through a first fulcrum pivot pin; and
    a first control coil pivotally coupled to the first lever.

13. The truck assembly of claim 12, wherein the housing is coupled to or forms part of a bolster of the truck assembly.

14. The truck assembly of claim 12, wherein the damping system further comprises a plurality of load coils, wherein the housing is supported on the plurality of load coils.

15. The truck assembly of claim 14, wherein the plurality of load coils are disposed around the first control coil that is pivotally coupled to the first lever.

16. The truck assembly of claim 12, wherein the first spring seat pivotally couples the first lever to the first control coil.

17. The truck assembly of claim 12, wherein the damping system further comprises:
    a second friction shoe extending outwardly from the housing and engaging the second column of the side frame of the truck assembly, wherein the second friction shoe comprises a second main body having a second engaging face connected to second lateral walls, wherein the second engaging face engages the second column;

a second lever pivotally coupled to the second friction shoe, wherein the second lever is also pivotally coupled to the housing to axially constrain the second lever in relation to the housing, the second lever including a second extension beam having a proximal end pivotally coupled to a second spring seat through a second spring pivot pin, wherein a second cross beam extends from a distal end of the second extension beam, and wherein the second cross beam is pivotally coupled to the housing through a second fulcrum pivot pin; and a second control coil pivotally coupled to the second lever.

18. The damping system of claim 1, wherein the first friction shoe is pivotally coupled to the first lever through a first shoe pivot pin extending through the first friction shoe and a first bracket of the first lever that extends over the first cross beam.

19. The damping system of claim 9, wherein the second friction shoe is pivotally coupled to the second lever through a second shoe pivot pin extending through the second friction shoe and a second bracket of the second lever that extends over the second cross beam.

20. The damping method of claim 10, wherein said pivotally coupling the first lever to the first friction shoe further comprises pivotally coupling a first shoe pivot pin extending through the first friction shoe and a first bracket of the first lever that extends over the first cross beam.

\* \* \* \* \*